(12) United States Patent
Saida (10) Patent No.: US 8,509,634 B2
(45) Date of Patent: Aug. 13, 2013

(54) IMAGE FORMING APPARATUS THAT ENABLES REDUCING TIME REQUIRED FOR ADJUSTMENT OPERATION

(75) Inventor: Tadaaki Saida, Kashiwa (JP)

(73) Assignee: Canon Kabushiki Kaisha (JP)

( * ) Notice: Subject to any disclaimer, the term of this patent is extended or adjusted under 35 U.S.C. 154(b) by 300 days.

(21) Appl. No.: 13/076,597

(22) Filed: Mar. 31, 2011

(65) Prior Publication Data

US 2011/0243588 A1 Oct. 6, 2011

(30) Foreign Application Priority Data

Apr. 2, 2010 (JP) ................................. 2010-086068

(51) Int. Cl.
*G03G 15/00* (2006.01)
(52) U.S. Cl.
USPC ................................. 399/38; 399/49; 399/301
(58) Field of Classification Search
USPC ........................................ 399/49, 66, 301, 38
See application file for complete search history.

(56) References Cited

U.S. PATENT DOCUMENTS

| | | | |
|---|---|---|---|
| 7,307,754 B2 | 12/2007 | Motoyama et al. | |
| 7,587,149 B2 * | 9/2009 | Suzuki et al. | 399/49 |
| 7,873,291 B2 * | 1/2011 | Kosuge et al. | 399/50 |
| 2002/0025179 A1 * | 2/2002 | Toyohara et al. | 399/49 |
| 2004/0136017 A1 | 7/2004 | Motoyama et al. | |
| 2007/0134010 A1 * | 6/2007 | Yokoyama | 399/39 |
| 2007/0134012 A1 * | 6/2007 | Suzuki et al. | 399/49 |
| 2008/0219682 A1 * | 9/2008 | Yamasaki et al. | 399/16 |
| 2009/0067893 A1 * | 3/2009 | Kurosawa | 399/301 |
| 2010/0226694 A1 * | 9/2010 | Osawa et al. | 399/301 |

FOREIGN PATENT DOCUMENTS

| | | | |
|---|---|---|---|
| JP | 2004-125988 A | | 4/2004 |
| JP | 2004102145 A | * | 4/2004 |

* cited by examiner

*Primary Examiner* — G. M. Hyder
(74) *Attorney, Agent, or Firm* — Rossi, Kimms & McDowell LLP

(57) ABSTRACT

An image forming apparatus that can reduce the time required for adjustment operations when a first adjustment operation that requires speed change and a second adjustment operation that does not require speed change overlap. When a first adjustment operation that can be performed at a first speed is to be performed during operation at a second speed lower than the first speed, the image formation speed is changed from the second speed to the first speed. When a second adjustment operation that can be performed at a plurality of image formation speeds is to be performed during operation at the second speed, the second adjustment operation is performed while maintaining the second speed. When both the first adjustment operation and the second adjustment operation are to be performed during operation at the second speed, the image formation speed is changed from the second speed to the first speed.

5 Claims, 6 Drawing Sheets

IMAGE FORMING APPARATUS THAT ENABLES REDUCING TIME REQUIRED FOR ADJUSTMENT OPERATION

BACKGROUND OF THE INVENTION

1. Field of the Invention

The present invention relates to an image forming apparatus that forms images using an electrophotographic process or an electrostatic recording process.

2. Description of the Related Art

In recent years, image forming apparatuses capable of forming color images (such as copiers and printers) have been required to form high-quality images on a plurality of types of sheets at high speed. Examples of methods to form images at high speed include a method that images are continuously formed by an image forming apparatus having image forming units for respective colors (yellow (Y), magenta (M), cyan (C), and black (K)).

Electrophotographic image forming apparatuses form electrostatic latent images by irradiating photosensitive drums with laser beams via a polygon mirror rotatively driven by a polygon motor, transfer toner images obtained by developing the electrostatic latent images using toner to an intermediate transfer belt, and further transfers the toner images to a sheet. Examples of methods to operate electrophotographic image forming apparatuses (color printers) at high speed include the following: a method that all processes (charging of photosensitive drums, exposure of the photosensitive drums with laser beams, development of electrostatic latent images using toner, transfer of toner images to a sheet, fixing of the toner images to the sheet, and so on) are speeded up, and a method that page intervals between images when images are formed in succession are reduced.

To form high-quality images using electrophotographic image forming apparatuses, a technique to align a position at which an image is formed with a sheet, a technique to reduce color shift in superimposing images of a plurality of colors on an intermediate transfer belt, and a technique to reduce changes in the densities of images to be formed.

In general, to reduce color shift caused by environmental changes such as temperature changes, aging changes, etc. of photosensitive drums provided for respective colors and an intermediate transfer belt, an electrophotographic image forming apparatus forms registration patches on the intermediate transfer belt, and reads the patches using a sensor to measure the amount of image shift. Then, based on the measurement result, the image forming apparatus corrects for the write timing of electrostatic latent images on the photosensitive drums in subsequent image formation. Also, the image forming apparatus provides control to form image density measurement patches on the intermediate transfer belt so as to make image densities uniform during successive image formation, and correct image densities according to densities obtained by reading the patches using a sensor so as to reduce changes in image densities caused by environmental changes.

While it is necessary to provide control to correct for various changes described above so as to form high-quality images, it is necessary to perform various correcting operations described above with little influence on image formation productivity so as to attain high productivity in image formation.

On the other hand, to efficiently perform and complete adjustment operations relating to color shift correction and toner density correction, there has been proposed a method that controls the order in which the adjustment operations are performed (see, for example, Japanese Laid-Open Patent Publication (Kokai) No. 2004-125988). According to the technique described in Japanese Laid-Open Patent Publication (Kokai) No. 2004-125988, the adjustment operations performed by an image forming apparatus having a plurality of image formation speeds (process speeds) at which images are formed include an adjustment operation performed only at a reference speed, and adjustment operations performed at various speeds. When the adjustment operation performed only at the reference speed is to be performed, the speed is changed to the reference speed first, and then the adjustment operations that can be performed at various speeds are sequentially performed.

The image forming apparatus described above changes the image formation speed according to a sheet on which an image is to be formed. On this occasion, when various adjustment operations are to be performed at various image formation speeds, if an adjustment operation that cannot be performed at that image formation speed arises, speed change is required, which increases adjustment time. For this reason, most of the various adjustment operations can be performed at the various image formation speeds, but part thereof can be performed only at the reference speed. As a result, when adjustment is required while the image forming apparatus is operating at an image formation speed other than the reference speed, the speed is changed to perform the adjustment operation, and after that, the speed is changed again. Thus, adjustment takes long.

SUMMARY OF THE INVENTION

The present invention provides an image forming apparatus that can reduce the time required for adjustment operations when an adjustment operation that requires speed change and an adjustment operation that does not require speed change overlap.

Accordingly, a first aspect of the present invention provides an image forming apparatus having a plurality of image formation speeds, comprising a changing unit configured to change an image formation speed between a first speed and a second speed lower than the first speed, a first adjustment unit configured to, when a first adjustment operation that can be performed at the first speed is to be performed during operation at the second speed, cause the changing unit to change the image formation speed from the second speed to the first speed, and perform the first adjustment operation, a second adjustment unit configured to, when a second adjustment operation that can be performed at the plurality of image formation speeds is to be performed during operation at the second speed, perform the second adjustment operation while maintaining the second speed, and a control unit configured to, when both the first adjustment operation and the second adjustment operation are to be performed during operation at the second speed, cause the changing unit to change the image formation speed from the second speed to the first speed, and then perform the first adjustment operation and the second adjustment operation.

According to the present invention, when the first adjustment operation and the second adjustment operation are to be performed in succession while the image forming apparatus is operating at an image formation speed other than the reference speed, the first adjustment operation and the second adjustment operation are to be performed in succession after the image formation speed is changed to the reference speed. Namely, because an adjustment operation that does not require speed change is performed together when an adjustment operation that requires speed change is performed, the time required for adjustment operations when an adjustment operation that requires speed change and an adjustment operation that does not require speed change overlap can be reduced, and the time required for entire image formation can be reduced.

Further features of the present invention will become apparent from the following description of exemplary embodiments (with reference to the attached drawings).

BRIEF DESCRIPTION OF THE DRAWINGS

FIGS. 3A to 3C are diagrams showing image adjustment test patch patterns and image density measurement patterns of the image forming apparatus, in which FIG. 3B shows an image density measurement pattern.

FIGS. 6A to 6B are diagrams useful in explaining speed change for an adjustment operation in the image forming apparatus, in which

DESCRIPTION OF THE EMBODIMENTS

The present invention will now be described in detail with reference to the drawings showing an embodiment thereof.

Figure 1:
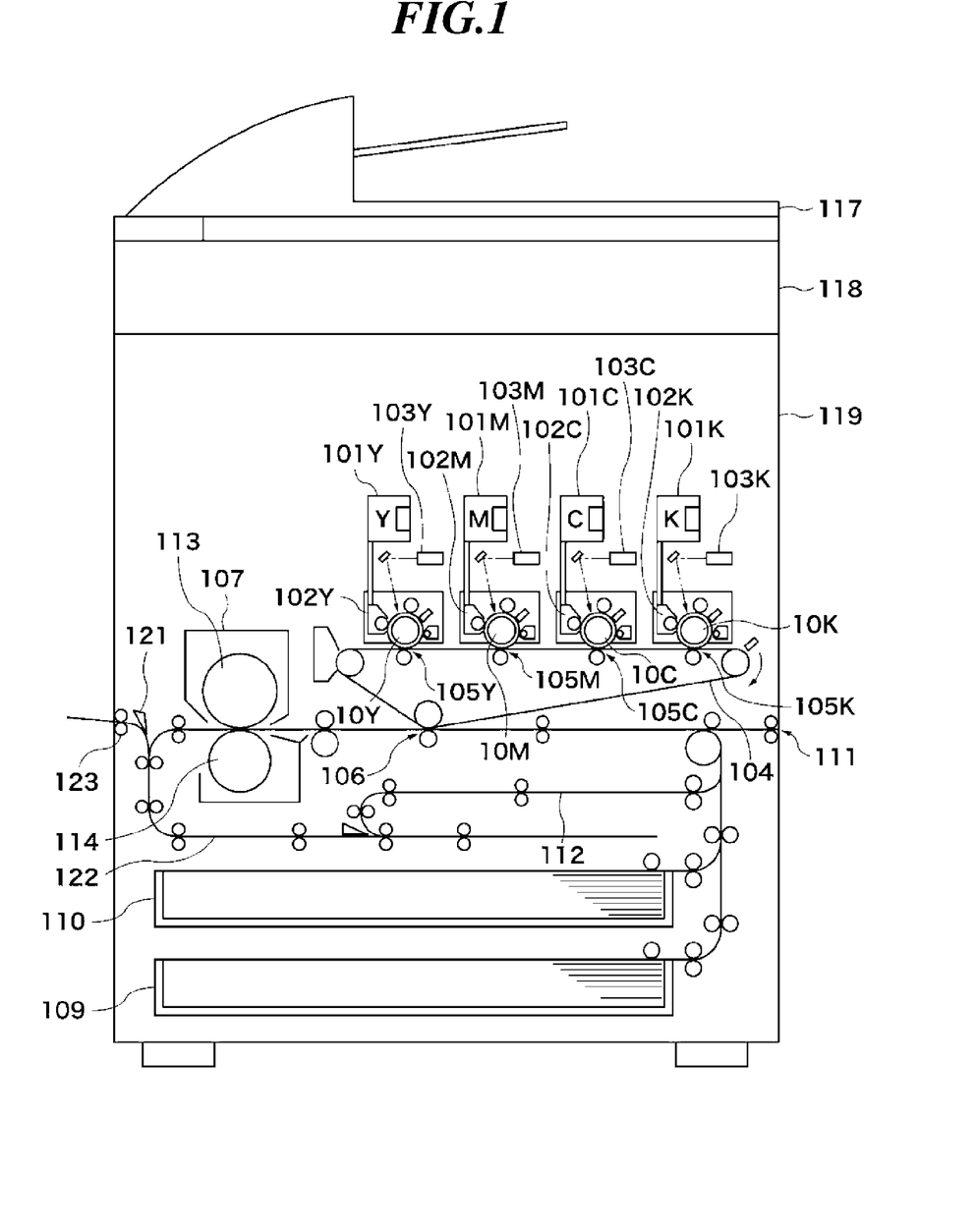
FIG. 1 is a diagram schematically showing an arrangement of an image forming apparatus according to an embodiment of the present invention.

FIG. 1 is a diagram schematically showing an arrangement of an image forming apparatus according to an embodiment of the present invention.

Referring to FIG. 1, the image forming apparatus is configured as a digital copier having an original feeder unit 117, an image reader unit 118, and a printer unit 119. The image forming apparatus forms images through an electrophotographic process in which it forms electrostatic latent images on photosensitive drums 10 (Y, M, C, and K) (photosensitive units), develops them using toner, transfers the toner images to an intermediate transfer belt 104 (a transfer unit), and further transfers the toner images from the intermediate transfer belt 104 to a sheet and fixes the toner images to the sheet.

The original feeder unit 117 conveys originals, which are placed on an original platen glass, one by one in order from the first page from left to right as viewed in the figure on the platen glass via a curved path, and then discharges the originals onto a discharged sheet tray. It should be noted that the conveyed originals may be stopped on the platen glass and read by moving a reader scanner unit, to be describe later, from left to right as viewed in the figure.

The image reader unit 118 has a reader scanner unit, an image sensor, and so on (not shown). The reader scanner unit is held at a predetermined position, and an original is read by passing above the reader scanner unit from left to right. When passing above the reader scanner unit, an original is irradiated with light from a lamp of the reader scanner unit, and reflected light from the original is guided to the image sensor via a mirror and converted to an eclectic signal.

The printer unit 119 has the photosensitive drums 10 (Y, M, C, and K), toner replenishing units 101 (Y, M, C, and K), developing units 102 (Y, M, C, and K), exposure control units 103 (Y, M, C, and K) for respective colors (Y, M, C, and K). In the following description, the characters (Y, M, C, and K) after the reference numerals will be omitted. Image data of an original read by the image sensor of the image reader unit 118 is subjected to image processing and sent to the exposure control units 103. The exposure control units 103 irradiate the respective photosensitive drums 10 with laser beams to form electrostatic latent images on the photosensitive drums 10.

The developing units 102 develop the respective electrostatic latent images on the photosensitive drums 10 using toner to form toner images on the photosensitive drums 10. The toner images on the photosensitive drums 10 are transferred to the intermediate transfer belt 104 by respective primary transfer units 105. It should be noted that image adjustment test patch patterns of the four YMCK colors, to be described later, are formed on the intermediate transfer belt 104.

The toner images on the intermediate transfer belt 104 are transferred to a sheet fed from any of a cassette 109, a cassette 110, a manual sheet feeding unit 111, and a double-sided conveying path 112 by a secondary transfer unit 106. A fixing unit 107 has a pressurizing roller 113 and a heating roller 114, and fixes the toner images on the sheet being conveyed.

In the case of one-sided printing, the sheet having passed the fixing unit 107 is guided temporarily to a path 122 by a flapper 121, and when a trailing end of the sheet leaves the flapper 121, the sheet is switched back and guided to discharging rollers 123 by the flapper 121. As a result, the sheet is discharged from the apparatus by the discharging rollers 123 with one side to which the toner images have been transferred facing downward. It should be noted that in the case of double-sided printing, the sheet is guided to the secondary transfer unit 106 via the path 122 and the double-sided conveying path 112, toner images are transferred to the other side of the sheet and fixed by the fixing unit 107, and then the sheet is discharged from the apparatus.

Figure 2:
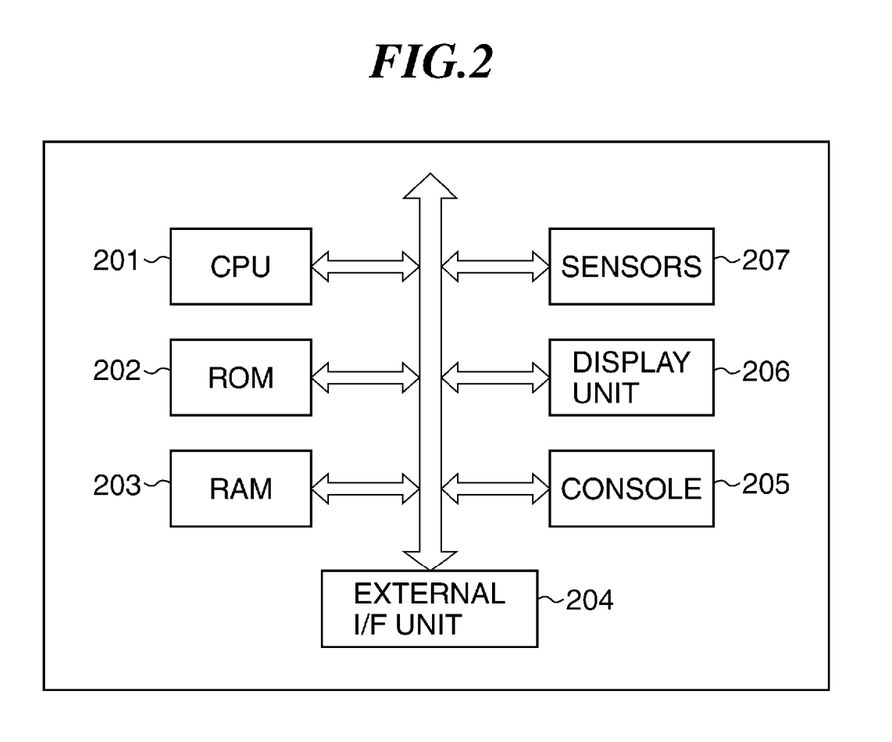
FIG. 2 is a block diagram schematically showing an arrangement of a control system of the image forming apparatus.

FIG. 2 is a block diagram schematically showing an arrangement of a control system of the image forming apparatus.

Referring to FIG. 2, the image forming apparatus has a CPU 201, a ROM 202, a RAM 203, an external interface (I/F) unit 204, a console 205, a display unit 206, and sensors 207. The CPU 201 controls the overall operation of the image forming apparatus, and carries out processes in a flowchart of FIG. 7 based on control programs. Also, the CPU 201 performs image formation speed change control, to be described later, using a color shift correction execution counter and a density correction execution counter. The ROM 202 stores control programs, which are executed by the CPU 201, and others.

The RAM 203 has a work area that is used by the CPU 201 when the CPU 201 controls the image forming apparatus. Also, the RAM 203 has a storage region where digital image data read off an original by the image reader unit 118, digital image data transmitted from an external apparatus outside the image forming apparatus via the external I/F unit 204, and so on are stored. Also, the RAM 203 is used as a work area where the digital image data is subjected to image processing.

In the RAM 203, the color shift correction execution counter and the density correction execution counter are expanded. The color shift correction execution counter is used to determine whether or not to perform color shift correction control for reducing color shift when images of multiple colors are superimposed to form a color image, and when the number of prints counted by the color shift correction execution counter is not less than a prescribed value, color shift correction is performed. The density correction execution counter is used to determine whether or not to perform toner density correction control for correcting the density of toner used for development, and when the number of prints counted by the density correction execution counter is not less than a prescribed value, toner density correction is performed. A detailed description will be given later with reference to FIG. 7.

Figure 3A:
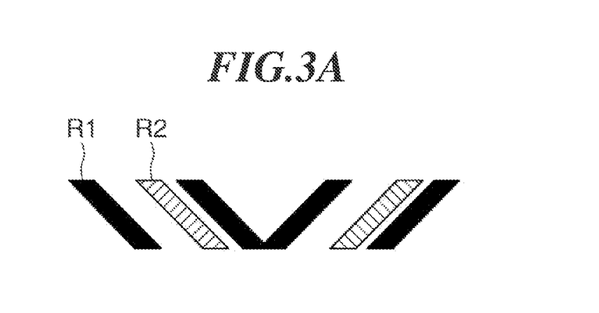
FIG. 3A shows patterns of magenta as a reference color and patterns of another color.
Figure 3B:
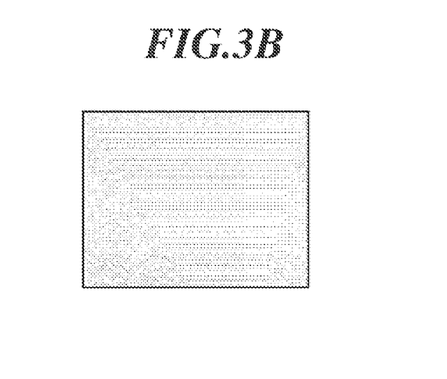
Figure 3C:
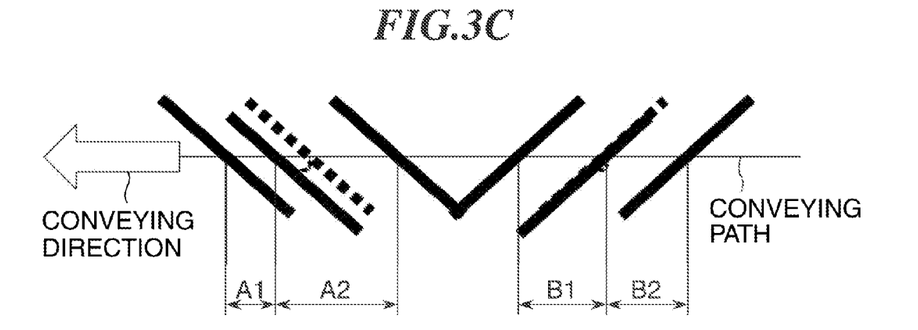
FIG. 3C shows a method to obtain the amount of shift in a main scanning direction relative to magenta as a reference color.

The external I/F unit 204 receives print job executing instructions sent from a computer connected to a network conforming to TCP/IP or the like, and sends information on an inside of the image forming apparatus to the computer. The console 205 is used for a user to set a copy job, a print job, and so on desired to be executed. A print job may be executed not only through settings from the console 205, but also from outside the image forming apparatus via the external I/F unit 204. The display unit 206 displays various information such as information set from the console 205. The sensors 207 include a registration sensor that reads image adjustment test patch patterns of the four YMCK colors (FIGS. 3A to 3C).

Based on the settings of a copy job (one-sided printing/double-sided printing) from the console 205, the CPU 201 causes the image reader unit 118 to read and digitalize an image on an original placed on the original platen glass, and stores the digital image data in the RAM 203. Also, in accordance with the settings of the copy job (one-sided printing/double-sided printing) from the console 205 and contents of the image read off the original by the image reader unit 118, the CPU 201 subjects the digital image data to required image processing, and stores, in the RAM 203, the digital image data that should be imaged.

Next, a description will be given of how the image forming apparatus according to the present embodiment having the above described arrangement operates with reference to FIGS. 3A to 7.

In the present embodiment, the image forming apparatus change the image formation speed depending on sheet thickness. The image formation speed is a speed at which an image formation process comprised of charging, exposure, development, transfer, fixing, and so on is performed. The image forming apparatus has a plurality of image formation speeds (three speeds V, V/2, and V/3). This is mainly because when the thickness of a sheet increases, the performance of the fixing unit 107 fixing toner images transferred to the sheet runs short, and hence the sheet conveying speed at the fixing unit 107 has to be changed according to the thickness of the sheet.

Among the image formation speeds, the speed V (a first speed) as a reference speed is the highest, and with respect to this reference speed, the speeds V/2 and V/3 (second speeds), which are integral submultiples of the speed V, are set. This aims at, during image formation control, decimating electrostatic latent images formed on the photosensitive drums 10 so as to prevent the rotational speed of the photosensitive drums 10 and image data from becoming uncorrelated to each other even when the speed is changed. With this arrangement, regarding color shift correction data, only data (adjustment values) at the speed V as the reference speed is held, and control to correct for color shift at the same adjustment values can be realized at different image formation speeds.

Next, a description will be given of a color shift correcting control operation (an image registration adjustment operation) in a case where the image forming apparatus forms color images. In the present embodiment, the color shift correcting control operation is an adjustment operation (a first adjustment operation) that can be performed only at the speed V (the reference image formation speed). Thus, even if color images are formed at the speed V/2 or the speed V/3 when sheets are thick, the color shift correcting control operation is performed after the image formation speed is temporarily changed from the speed V/2 or the speed V/3 to the speed V as the reference speed. After the color shift correcting control operation is completed, the image formation speed is returned again to the speed V/2 or the speed V/3 to resume image formation. The adjustment is always performed at the speed V to calculate correction values at the speed V for use in the color shift correcting control operation.

In the present embodiment, regarding the color shift correcting control operation in a case where color images are formed at the speed V2 or the speed V/3, the color shift correcting control operation is performed based on correction values at the speed V to decimate image data (electrostatic latent images formed on the photosensitive drums 10). The image forming apparatus is configured so that as a result, the image formation speeds (V, V/2, and V/3) and image data can be consistent with each other.

Figure 4:
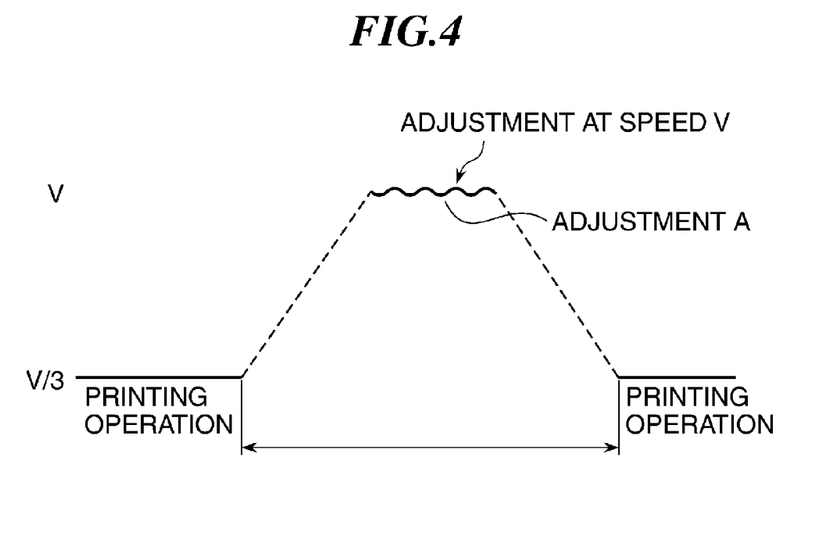
FIG. 4 is a diagram useful in explaining speed change for an adjustment operation in the image forming apparatus.

FIG. 4 is a diagram useful in explaining speed change for an adjustment operation in the image forming apparatus.

FIG. 4 shows an example where an adjustment operation for color shift correction (an adjustment A) is performed at the speed V as the reference speed when the image forming apparatus is performing printing at the speed V/3. To correct for color shift of the four YMCK colors automatically (under the control of the image forming apparatus) without involvement by the user, the image forming apparatus forms image adjustment test patch patterns of the respective colors on the intermediate transfer belt 104 (see FIGS. 3A and 3C). The image forming apparatus reads images of the image adjustment test patch patterns using a registration sensor, and changes settings relating to exposure control for the exposure control units 103 based on adjustment values obtained as a result.

FIGS. 3A to 3C are diagrams showing image adjustment test patch patterns and an image density measurement pattern of the image forming apparatus, in which FIG. 3A shows exemplary patterns of magenta as a reference color and exemplary patterns of another color, FIG. 3B shows an image density measurement pattern, and FIG. 3C shows a method to obtain the amount of shift in a main scanning direction relative to magenta as a reference color.

Referring to FIG. 3A, the image adjustment test patch patterns (registration patches) are comprised of patterns R1 of magenta as the reference color, and patterns R2 of another color (cyan in this example). By reading the test patch patterns using the registration sensor, the amount of shift of the other color relative to magenta as the reference color can be measured. The test patch patterns of one set comprised of magenta and another color are formed in succession between pages (the present page and the next page). FIG. 3B shows the image density measurement pattern.

The method to obtain the amount of shift of the other color relative to magenta as the reference color will now be described with reference to FIG. 3C. With respect to the test patch patterns formed on the intermediate transfer belt 104, distances designated by A1, A2, B1, and B2 are detected by the registration sensor. The distances A1, A2, B1, and B2 correspond to distances in the conveying direction between positions at which the sheet conveying path and the test patch patterns intersect each other. When the amount of shift in a main scanning direction relative to magenta as the reference color is ΔH, and the amount of shift in a sub scanning direction relative to magenta as the reference color is ΔV, the amount of shift ΔH in the main scanning direction and the amount of shift ΔV in the sub scanning direction are calculated according to the following arithmetic expression:

$$\Delta H = \{(B2-B1)/2 - (A2-A1)/2\}/2$$

$$\Delta V = \{(B2-B1)/2 + (A2-A1)/2\}/2$$

The amount of shift calculated according to the above arithmetic expression is reflected on subsequent image formation.

Next, a description will be given of a toner density correcting control operation in the image forming apparatus. In the present embodiment, the toner density correcting control operation is an adjustment operation that can be performed at a plurality of image formation speeds (V, V/2, and V/3) (a second adjustment operation). The image forming apparatus according to the present embodiment has, in the developing units, no sensors for measuring toner density. For this reason, the consumed amount of toner is calculated based on the number of video counts obtained by counting video signals corresponding to image data printed on sheets, and the calculated consumed amount of toner is regarded as the amount of toner with which the developing units 102 are replenished from toner cartridges.

The toner cartridges are each equipped with a screw, not shown. The amount of toner for replenishment G when the screw has been rotated for a predetermined time period is known in advance, and the relationship between toner supply amount X and screw rotation time period t is represented by the following primary expression, X=Gt. In order for toner to be uniformly supplied to the developing unit 102 when the developing unit 102 is replenished with toner, the replenishment operation must be performed within a time period for which the developing unit 102 is operating. When the time period for which the screw rotates with toner replenishment is longer than the time period required for one development operation, the replenishment operation is performed over two development operations.

The replenishment operation based on the number of video counts can maintain a substantially proper amount of toner to be supplied within a short time. However, there is an error in the amount of toner to be supplied, and hence whether or not an actually developed toner image has correct toner density cannot be controlled. Thus, in the present embodiment, after printing on a predetermined number of sheets is completed, test patch patterns are formed on the intermediate transfer belt 104, densities of the test patch patterns are measured, and measurement results are fed back to a system that calculates the amount of toner to be supplied. This compensates for an error in the amount of toner to be supplied, which is caused by toner replenishment based on the number of video counts.

Test patch patterns are formed on the intermediate transfer belt 104 basically when the image formation speed is kept at the speed V. Namely, when adjustment is performed during printing at the speed V as the reference speed, test patch patterns are formed on the intermediate transfer belt 104 with the image formation speed being kept at the speed V, and the densities of the test patch patterns are read and fed back.

Figure 5:
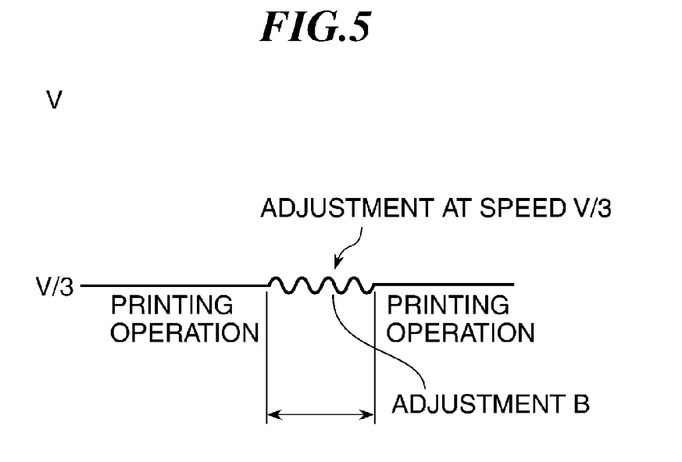
FIG. 5 is a diagram useful in explaining speed change for an adjustment operation in the image forming apparatus.

FIG. 5 is a diagram useful in explaining speed change for an adjustment operation in the image forming apparatus.

FIG. 5 shows an adjustment operation for correcting toner density at the speed V/3 during printing at the speed V/3 (an adjustment B). As distinct from color shift correction control, toner density correction control is an adjustment operation that can be performed at any of the image formation speeds V, V/2, and V/3. This is because the detection of toner density is not dependent on image formation speeds. Moreover, when the toner density correction control is to be performed after the speed is changed even though the number of test patch patterns in toner density correction control is smaller than that in color shift correction control, it takes extra time to change the speed. For this reason, when an adjustment operation for correcting toner density is required during printing at the speed V, the adjustment operation is performed with the image formation speed being kept at the speed V. Also, when an adjustment operation for correcting toner density is required during printing at the speed V/2 or V/3, the adjustment operation is performed with the image formation speed being kept at the speed V/2 or V/3.

Next, a description will be given of a case where color shift correction control and toner density correction control described above are performed in synchronization with each other.

Figure 6A:
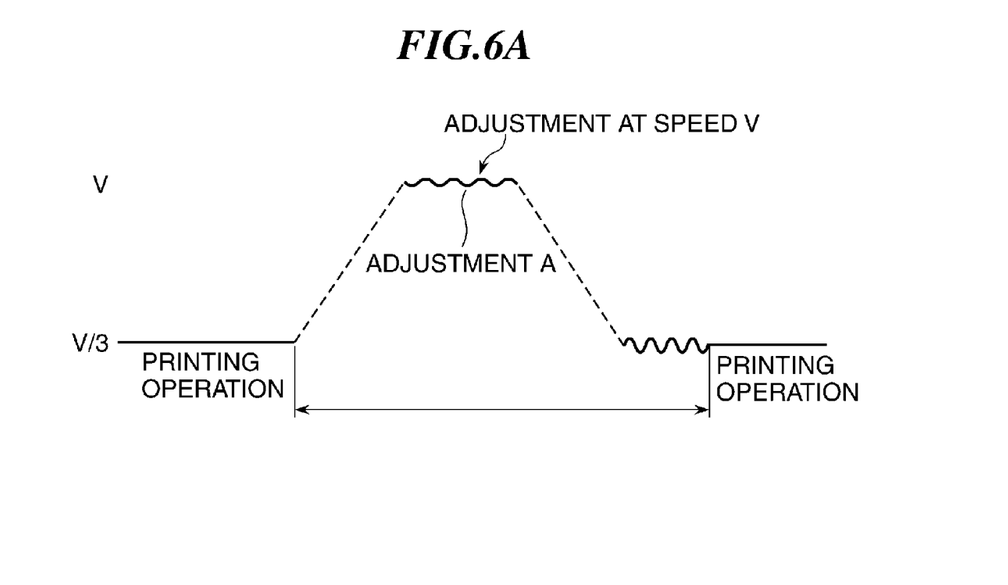
FIG. 6A shows a case where a color shift correcting operation that can be performed at only a reference speed V and an adjustment operation that can be performed at only a speed V/3 are performed in synchronization with each other.
Figure 6B:
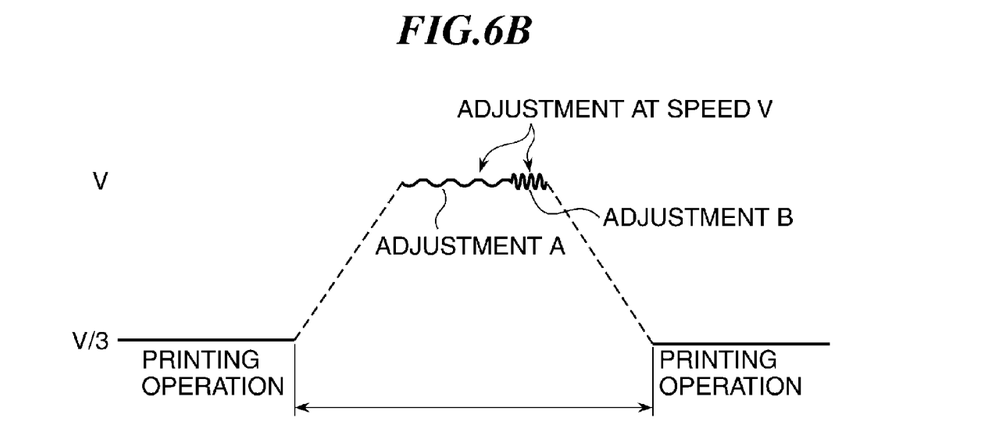
FIG. 6B shows a case where a color shift correcting operation and a toner density correcting operation are performed in synchronization with each other.

FIGS. 6A to 6B are diagrams useful in explaining speed change for an adjustment operation in the image forming apparatus, in which FIG. 6A shows a case where a color shift correcting operation that can be performed only at the speed V and an adjustment operation that can be performed only at the speed V/3 are performed in synchronization with each other, and FIG. 6B shows a case where a color shift correcting operation and a toner density correcting operation are performed in synchronization with each other.

FIG. 6A is a diagram useful for comparison although there are no corresponding operations in the present embodiment, and shows a case where an adjustment operation is required when printing on sheets is performed at the image formation speed V/3. When printing is performed at the image formation speed V/3, the speed is changed from the speed V/3 to the speed V first so as to perform color shift correction control. After the speed is changed to the speed V, color shift correction control (an adjustment A) is performed. Next, the speed is changed from the speed V to the speed V/3 so as to perform an adjustment operation at the speed V/3, and after the speed is changed to the speed V/3, the adjustment operation (an adjustment B) is performed. After the adjustment operation is completed, the process returns to the printing operation.

FIG. 6B shows a case where an adjustment operation is required when printing on sheets is performed at the image formation speed V/3 as with FIG. 6A. FIG. 6B differs from FIG. 6A in the order in which switching between image formation speeds and adjustment operations are performed. As described above, the same adjustment can be made by adjustment operations for toner density correction control at either the speed V or the speed V/3, and hence control is performed in reverse order. When printing is performed at the image formation speed V/3, the speed is changed from the speed V/3 to the speed V first so as to perform the color shift correction control. After the speed is changed to the speed V, the color shift correction control is performed. Then, the toner density correction control is performed without changing the speed. After the adjustment operations (the adjustment A and the adjustment B) are completed, the speed is changed to the speed V/3 again, and the process returns to the printing operation.

Figure 7:
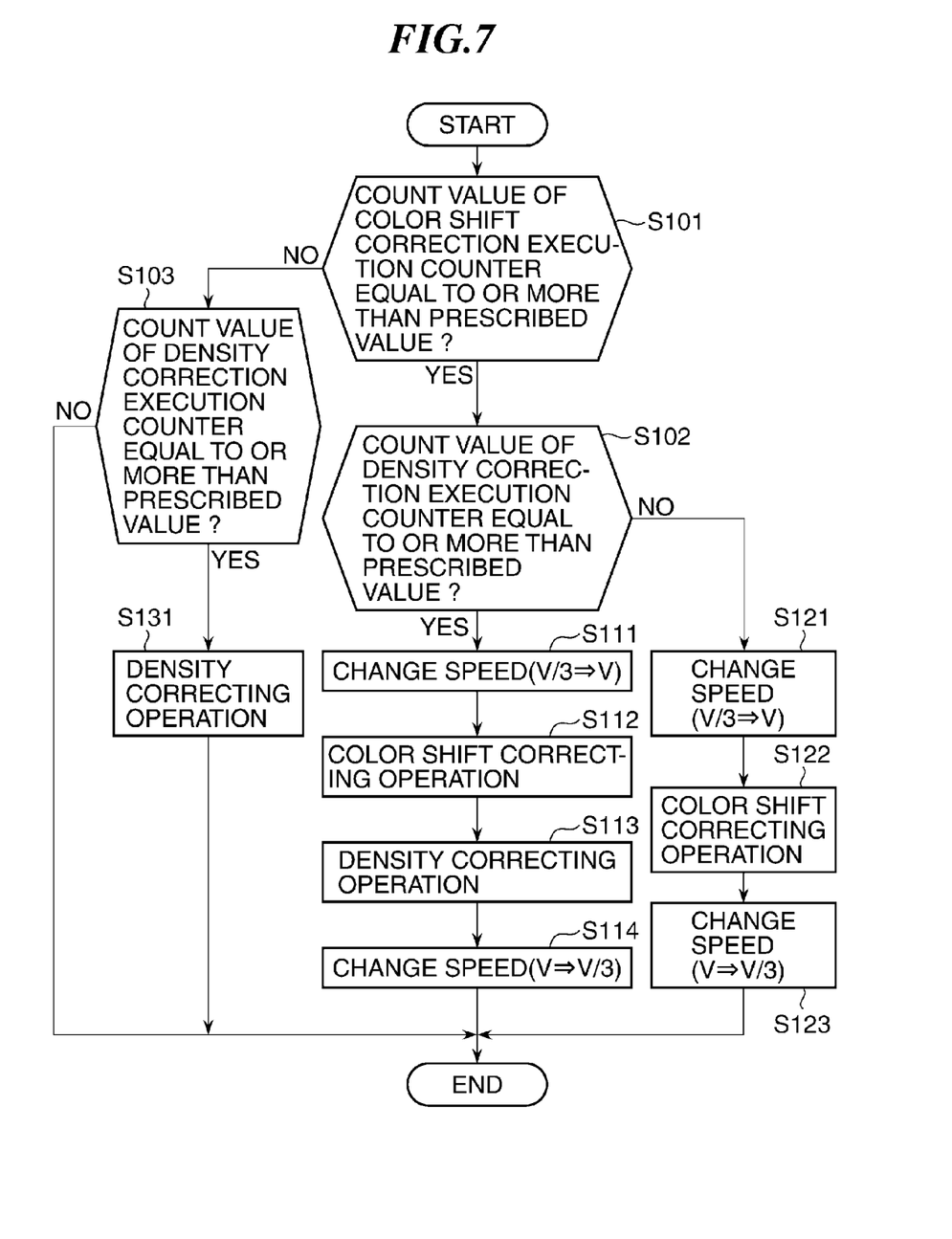
FIG. 7 is a flowchart of adjustment operation control performed in the image forming apparatus.

FIG. 7 is a flowchart of adjustment operation control performed in the image forming apparatus.

Referring to FIG. 7, the present process is performed when the image formation speed is a speed (a second speed) other than the speed V (a first speed) as the reference speed. This is because the image formation speed is not changed when adjustment is required during printing at the speed V. It should be noted that here, the speed V/3 is taken as an example of the second speed.

First, the CPU 201 of the image forming apparatus determines whether or not the count value of the color shift correction execution counter is equal to or more than a prescribed value (step S101). When the count value of the color shift correction execution counter is equal to or more than the prescribed value, and it is determined that color shift correction is to be performed, the CPU 201 determines whether or not the count value of the density correction execution counter is equal to or more than a prescribed value (step S102).

When determining that the count value of the density correction execution counter is equal to or more than the prescribed value, and toner density correction is to be performed, the CPU 201 switches the image formation speed from the speed V/3 to the speed V (step S111). Then, the CPU 201 performs a color shift correcting operation (step S112), and subsequently performs a toner density correcting operation (step S113). After completing the correcting operation, the CPU 201 changes the image formation speed from the speed V to the speed V/3 (step S114), and terminates the present process.

When the count value of the density correction execution counter is less than the prescribed value, and it is determined that toner density correction is not to be performed in the step S102, the CPU 201 switches the image formation speed from the speed V/3 to the speed V (step S121). Then, the CPU 201 performs a color shift correcting operation (step S122). After completing the adjustment operation, the CPU 201 switches the image formation speed from the speed V to the speed V/3 (step S123), and terminates the present process.

When determining that the count value of the color shift correction execution counter is less than the prescribed value, and color shift correction is not to be performed in the step S101, the CPU 201 determines whether or not the count value of the density correction execution counter is equal to or more than the prescribed value (step S103). When determining that the count value of the density correction execution counter is less than the prescribed value, and toner density correction is not to be performed, the CPU 201 terminates the present process with doing nothing. When determining that the count value of the density correction execution counter is equal to or more than the prescribed value, and toner density correction is to be performed, the CPU 201 performs only a toner density correcting operation without changing the image formation speed (step S131), and terminates the present process.

It should be noted that the processes in the steps S111 to S114 in FIG. 7 are performed when color shift correction control and density correction control are performed in synchronization with each other, but the present invention is not limited to this. For example, even when there is a lag in the execution timing of color shift correction control and density correction control, the CPU 201 may perform the processes in the steps S111 to S114 insofar as the lag falls inside a predetermined range.

As described above in detail, according to the present embodiment, when the first adjustment operation and the second adjustment operation and the second adjustment operation are performed in succession during operation at an image formation speed different from the reference image formation speed, the first adjustment operation are performed in succession after the image formation speed is changed to the reference image formation speed. Namely, when an adjustment operation that requires changing of image formation speeds is to be performed, an adjustment operation that does not require changing of image formation speeds is performed as well. As a result, when an adjustment operation that requires speed change and an adjustment operation that does not require speed change overlap, the time required for the adjustment operations can be reduced, and the time required for execution of the entire print job can be reduced.

Although in the above described embodiment, toner density correction control is given as an example of an adjustment operation that can be performed at any one of the plurality of image formation speeds (V, V/2, and V/3), the present invention is not limited to this. The adjustment operation may be a transfer voltage adjustment operation in which transfer voltage at which toner images formed on the photosensitive drums are transferred to the intermediate transfer belt is adjusted.

Although in the above described embodiment, the image forming apparatus forms images using the electrophotographic process as an image formation process, the present invention is not limited to this. The present invention may be applied to an image forming apparatus that forms images using an electrostatic recording process as an image formation process.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-086068 filed Apr. 2, 2010, which is hereby incorporated by reference herein in its entirety.

What is claimed is:

1. An image forming apparatus having a plurality of image formation speeds, comprising:
   a changing unit configured to change an image formation speed between a first speed and a second speed lower than the first speed;
   a first adjustment unit configured to, when a first adjustment operation that can be performed at the first speed is to be performed during operation at the second speed, cause said changing unit to change the image formation speed from the second speed to the first speed, and perform the first adjustment operation;
   a second adjustment unit configured to, when a second adjustment operation that can be performed at the plurality of image formation speeds is to be performed during operation at the second speed, perform the second adjustment operation while maintaining the second speed; and
   a control unit configured to, when both the first adjustment operation and the second adjustment operation are to be performed during operation at the second speed, cause said changing unit to change the image formation speed from the second speed to the first speed, and then perform the first adjustment operation and the second adjustment operation.

2. An image forming apparatus according to claim 1, wherein an image formation process used by the image forming apparatus is an electrophotographic process in which an image is formed by developing an electrostatic latent image formed on a photosensitive unit using toner, and transferring the developed toner image to a sheet via a transfer unit, the first adjustment operation is an image registration adjustment operation in which shift occurring when the toner image is transferred to the sheet via the transfer unit is corrected for, and the second adjustment operation is a toner density adjustment operation in which a density of the toner used for the development is adjusted.

3. An image forming apparatus according to claim 1, wherein an image formation process used by the image forming apparatus is an electrophotographic process in which an image is formed by developing an electrostatic latent image formed on a photosensitive unit using toner, and transferring the developed toner image to a sheet via a transfer unit, the first adjustment operation is an image registration adjustment operation in which shift occurring when the toner image is transferred to the sheet via the transfer unit is corrected for, and the second adjustment operation is a transfer voltage adjustment operation in which a transfer voltage applied when the toner image formed on the photosensitive unit is transferred to the sheet via the transfer unit is adjusted.

4. An image forming apparatus according to claim 1, wherein a time period required to perform the second adjustment operation is shorter than a time period required to perform the first adjustment operation.

5. An image forming apparatus according to claim 1, wherein even when there is a lag in execution timing between the first adjustment operation and the second adjustment operation during operation at the second speed, said control unit performs the first adjustment operation and the second adjustment operation after causing said changing unit to change the image formation speed from the second speed to the first speed when the lag falls inside a predetermined range.

* * * * *